(12) United States Patent
Zhang et al.

(10) Patent No.: US 10,588,182 B2
(45) Date of Patent: Mar. 10, 2020

(54) SEMICONDUCTOR MICROWAVE OVEN AND SEMICONDUCTOR MICROWAVE SOURCE THEREOF

(71) Applicants: MIDEA GROUP CO., LTD., Foshan (CN); GUANGDONG MIDEA KITCHEN APPLIANCES MANUFACTURING CO., LTD., Foshan (CN)

(72) Inventors: Feina Zhang, Foshan (CN); Xiangwei Tang, Foshan (CN); Xiantao Du, Foshan (CN); Minyong Liu, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 457 days.

(21) Appl. No.: 15/314,060

(22) PCT Filed: Nov. 6, 2014

(86) PCT No.: PCT/CN2014/090428
§ 371 (c)(1),
(2) Date: Nov. 25, 2016

(87) PCT Pub. No.: WO2015/180416
PCT Pub. Date: Dec. 3, 2015

(65) Prior Publication Data
US 2017/0188417 A1    Jun. 29, 2017

(30) Foreign Application Priority Data

May 28, 2014 (CN) .......................... 2014 1 0232381
May 28, 2014 (CN) .......................... 2014 1 0232874

(51) Int. Cl.
    H05B 6/68    (2006.01)
    H05B 6/70    (2006.01)

(52) U.S. Cl.
    CPC ............ *H05B 6/707* (2013.01); *H05B 6/686* (2013.01); *H05B 2206/044* (2013.01); *Y02B 40/143* (2013.01)

(58) Field of Classification Search
    CPC .. H05B 6/686; H05B 6/707; H05B 2206/044; Y02B 40/143
    (Continued)

(56) References Cited

U.S. PATENT DOCUMENTS

| | | | |
|---|---|---|---|
| 2010/0176121 A1* | 7/2010 | Nobue | H05B 6/686 219/716 |
| 2010/0176123 A1* | 7/2010 | Mihara | H05B 6/686 219/746 |

(Continued)

FOREIGN PATENT DOCUMENTS

| | | |
|---|---|---|
| CN | 101979923 A | 2/2011 |
| CN | 101502170 B | 1/2012 |

(Continued)

OTHER PUBLICATIONS

ISA/CN, International Search Report for PCT/CN2014/090428 dated Mar. 10, 2015.

(Continued)

*Primary Examiner* — Quang T Van
(74) *Attorney, Agent, or Firm* — Seed IP Law Group LLP

(57) ABSTRACT

A semiconductor microwave oven and a semiconductor microwave source thereof. The semiconductor microwave oven includes: a body, a microwave input device, a semiconductor microwave source and a control device. The semiconductor microwave source includes a signal source, a power divider and N drive amplifiers. The signal source is (Continued)

configured to generate a first microwave signal. Power of the first microwave signal is allocated by the power divider to generate N second microwave signals. Each drive amplifier is configured to conduct drive amplification on the second microwave signal, and respectively to input same to the microwave input device to transmit into the chamber. The control device is configured to control the signal source to generate the first microwave signal. The microwave oven shares one signal source to guarantee operating at the same frequency, thereby realizing the highly efficient power output.

14 Claims, 12 Drawing Sheets

(58) Field of Classification Search
USPC .............. 219/704, 716, 746, 748, 696, 747
See application file for complete search history.

(56) References Cited

U.S. PATENT DOCUMENTS

| | | | | |
|---|---|---|---|---|
| 2011/0168699 | A1* | 7/2011 | Oomori | H01L 21/67115 219/748 |
| 2012/0067873 | A1* | 3/2012 | Mihara | H05B 6/686 219/704 |
| 2012/0103972 | A1 | 5/2012 | Okajima | |
| 2012/0152939 | A1 | 6/2012 | Nobue et al. | |
| 2014/0305933 | A1* | 10/2014 | Tang | H05B 6/702 219/696 |

FOREIGN PATENT DOCUMENTS

| | | |
|---|---|---|
| CN | 102474924 A | 5/2012 |
| CN | 101743778 B | 11/2012 |
| EP | 0085110 | 8/1983 |
| EP | 2205043 | 7/2010 |
| EP | 2453716 | 5/2012 |
| JP | S55150589 | 11/1980 |
| JP | S56132793 | 10/1981 |
| JP | 2000357583 A | 12/2000 |
| JP | 2008066292 | 3/2008 |
| JP | 2008269784 A | 11/2008 |
| WO | 2009011111 | 1/2009 |
| WO | 2009050893 | 4/2009 |
| WO | 2011004561 | 1/2011 |
| WO | 2011033740 | 3/2011 |

OTHER PUBLICATIONS

ISA/CN, Written Opinion of the International Searching Authority for PCT/CN2014/090428 dated Mar. 10, 2015.
The State Intellectual Property Office of People's Republic of China, First Office Action for CN201410232874.X, dated Aug. 9, 2016.
Canadian Intellectual Property Office, Office Action for CA2950450, dated Sep. 28, 2017.
EPO, Office Action for EP Application No. 14893395, dated Jan. 5, 2018.
SIPO, First Office Action for CN Application No. 201410232381, dated Jul. 4, 2016.

* cited by examiner

SEMICONDUCTOR MICROWAVE OVEN AND SEMICONDUCTOR MICROWAVE SOURCE THEREOF

CROSS-REFERENCE TO RELATED APPLICATIONS

This application is a U.S. national phase application based up an International Application No. PCT/CN2014/090428, filed on Nov. 6, 2014, the entire contents of which are incorporated herein by reference.

FIELD

The present disclosure relates to microwave oven technology field, and more particularly to a semiconductor microwave oven and a semiconductor microwave source thereof.

BACKGROUND

A microwave oven is a common appliance used to heat or cook food, and its principle is to generate microwave using a microwave source. The microwave makes water molecules in food generate high-frequency oscillation, so as to generate friction heat to heat or cook the food.

The conventional microwave oven includes a power source, a microwave source, a chamber, and a door, etc. The microwave source is a core component used for generating microwave, and it is stimulated by a high-voltage power to generate microwave. The microwave is transmitted through the waveguide and coupled to the chamber used for storing food. The microwave source of the conventional microwave oven generates microwave using a magnetron, in which the magnetron is operated at a working voltage of around 4000 volts. Therefore, an electrical safety hazard exists, the wastage is large, and the shape of the microwave oven is limited since the volume of the magnetron is so large.

At present, the semiconductor microwave technology is under a rapid development. The efficiency of generating microwave by the semiconductor is improved, the cost is lower, the weight becomes lighter, and the power density per unit volume becomes larger and larger, which makes the semiconductor microwave technology possible in the microwave oven application. However, limited by the semiconductor device, the output power level of the semiconductor microwave source is relatively low. Therefore, it is difficult to meet the required power output of the microwave oven.

SUMMARY

The present disclosure is provided based on knowledge on following problems and facts.

As shown in FIG. 1A and FIG. 1B, a semiconductor microwave oven in the related art has multiple semiconductor microwave sources independent of each other to generate microwaves respectively. As shown in FIG. 1A, the microwaves respectively generated by the multiple semiconductor microwave sources independent of each other are combined into a high-power microwave via a power combiner, finally the combined high-power microwave is fed into a chamber, such that the microwave oven can reach a better heating efficiency; as shown in FIG. 1B, after the multiple semiconductor microwave sources independent of each other generate microwaves respectively, the microwaves are fed into the chamber by corresponding waveguide boxes respectively, such that the high-power microwave output is realized, and the microwave oven can reach a better heating efficiency.

However, if operating at different frequencies, the semiconductor microwave sources independent of each other will introduce a frequency combination, such that conversion efficiency is reduced. Even when the frequency of each semiconductor microwave source is set at a same frequency, since a semiconductor component itself in each semiconductor microwave source varies, it is hard to ensure the correspondence of the actual working frequency of each semiconductor microwave source, such that the energy efficiency is greatly reduced during the multi-source feedback.

According to an aspect of embodiments of the present disclosure, a semiconductor microwave oven is provided. The semiconductor microwave oven includes: a body, including a chamber; a microwave input device, in communication with the chamber; a semiconductor microwave source, including: a signal source configured to generate a first microwave signal, a power divider including a first input end and N output ends, in which the first input end of the power divider is connected to the signal source, power of the first microwave signal is allocated by the power divider according to a preset proportion to generate N second microwave signals with a same frequency, and the N second microwave signals with the same frequency correspond to the N output ends respectively for outputting, where, N is an integer larger than or equal to 2, and N drive amplifiers, in which the N drive amplifiers are connected to the N output ends respectively, and each drive amplifier is configured to conduct a drive amplification on a corresponding second microwave signal and to input the second microwave signal after the drive amplification to the microwave input device, so as to transmit via the microwave input device to the chamber; and a control device, configured to control the signal source to generate the first microwave signal.

According to another aspect of embodiments of the present disclosure, a semiconductor microwave source of a semiconductor microwave oven is provided. The semiconductor microwave source includes: a signal source, configured to generate a first microwave signal; a power divider, including a first input end and N output ends, in which the first input end of the power divider is connected to the signal source, power of the first microwave signal is allocated by the power divider according to a preset proportion to generate N second microwave signals with a same frequency, and the N second microwave signals with the same frequency correspond to the N output ends respectively for outputting, where, N is an integer larger than or equal to 2; and N drive amplifiers, connected to the N output ends respectively, in which each drive amplifier is configured to conduct a drive amplification on a corresponding second microwave signal and to input the second microwave signal after the drive amplification to the microwave input device, so as to transmit via the microwave input device to the chamber; where, the signal source is configured to generate the first microwave signal under a control of a control device of the semiconductor microwave oven.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above-described and/or other aspects and advantages of embodiments of the present disclosure will become apparent and more readily appreciated from the following descriptions made with reference to the drawings, in which.

DETAILED DESCRIPTION

Figure 1A:
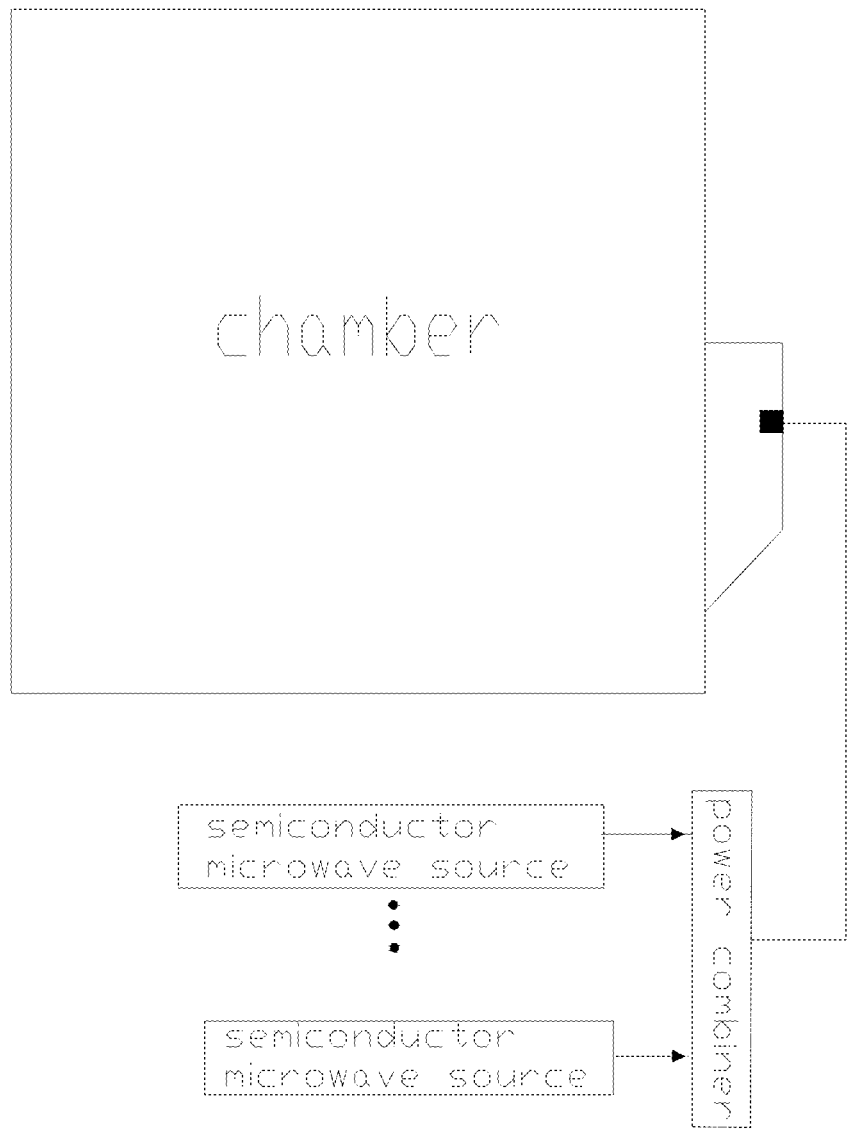
FIG. 1A is a schematic diagram of a semiconductor microwave oven in the related art.
Figure 1B:
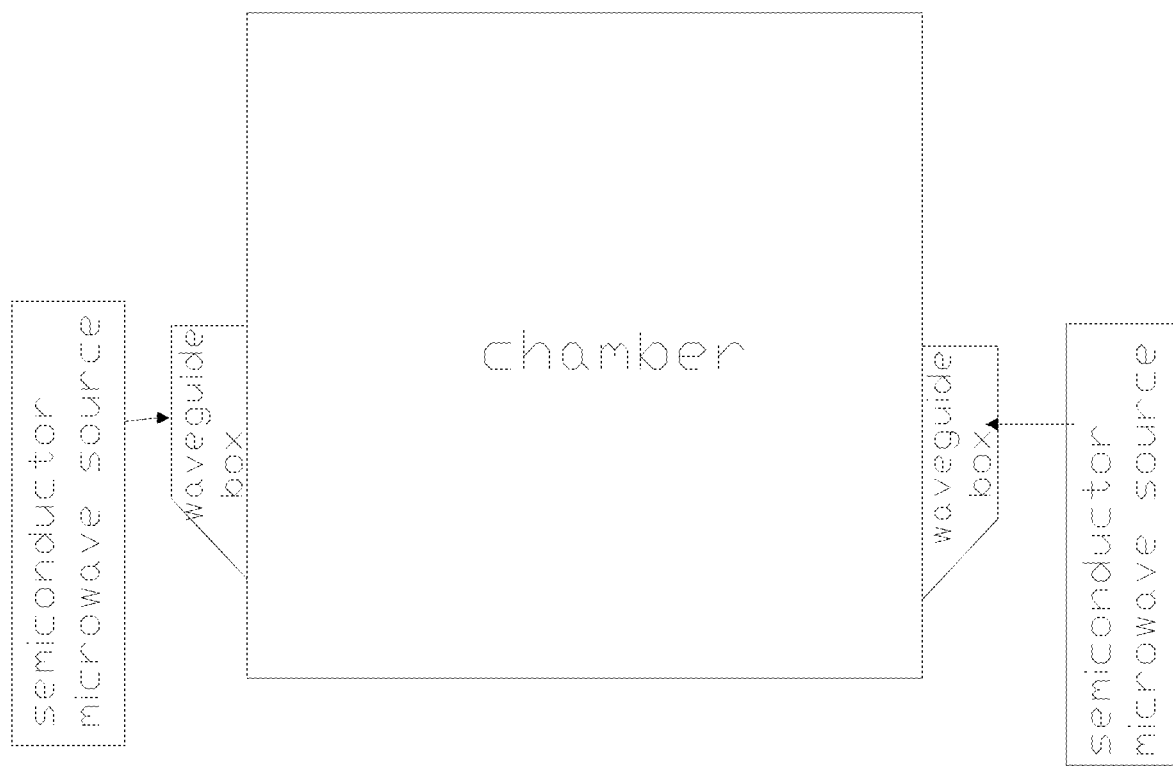
FIG. 1B is a schematic diagram of another semiconductor microwave oven in the related art.

Exemplary embodiments of the present disclosure will be described in detail herein, and examples thereof are illustrated in accompanying drawings. Throughout figures referred by the following description, the same reference number in different figures indicates the same or similar elements unless otherwise stated. Implementations described in the following exemplary embodiments are explanatory, illustrative, and used to generally understand the present disclosure. The exemplary embodiments shall not be construed to limit the present disclosure.

Various embodiments or examples are provided in the following description to implement different structures of the present disclosure. In order to simplify the present disclosure, certain elements and settings will be described. However, these elements and settings are only by way of example and are not intended to limit the present disclosure. In addition, reference numerals and/or letters may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present invention, it should be noted that, unless specified and limited otherwise, the terms "mounted," "connected," "coupled," and the like should be used broadly, and for example, may be mechanical or electrical connections; may also be inner communications of two elements; may also be direct connections or indirect connections via intervening structures, which can be understood by those skilled in the art according to specific situations.

A semiconductor microwave oven and a semiconductor microwave source of a semiconductor microwave oven will be described according to embodiments of the present disclosure referring to drawings as follows.

Figure 2A:
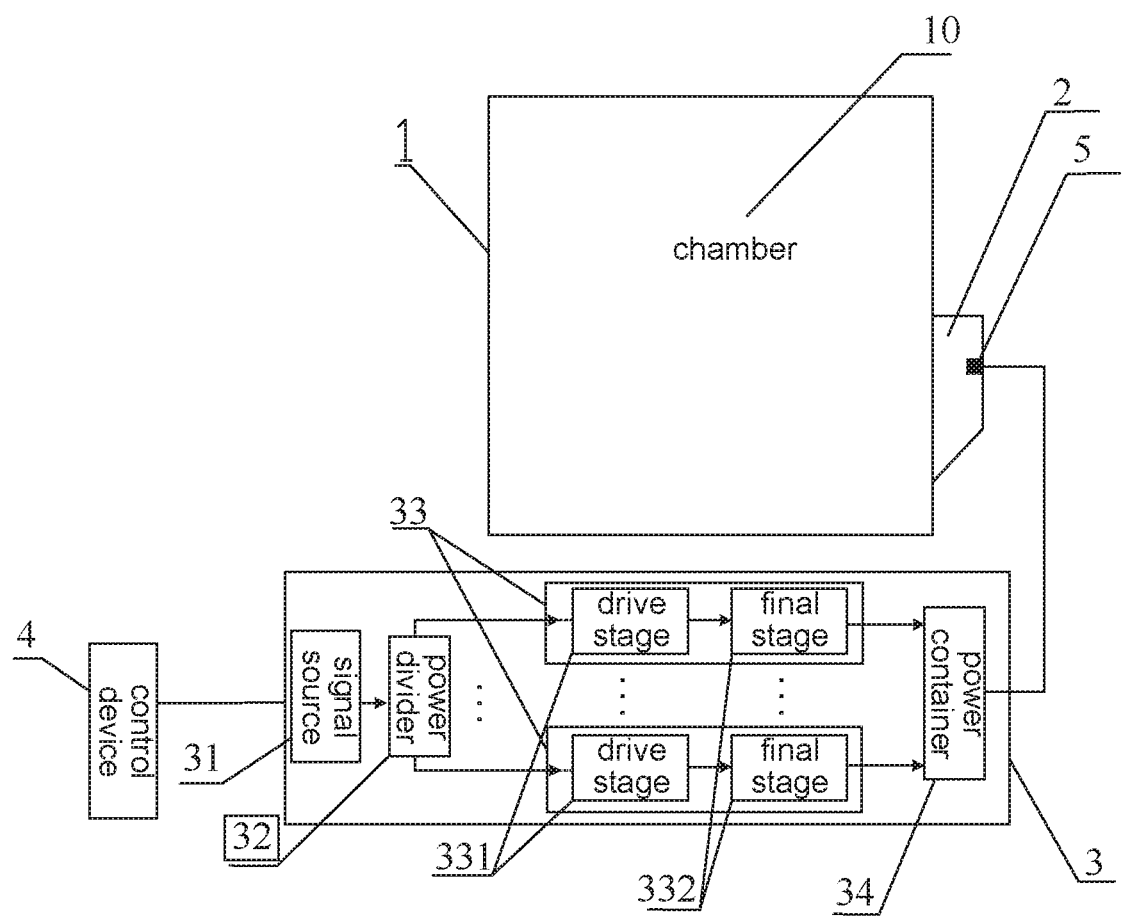
FIG. 2A is a schematic diagram of a semiconductor microwave oven according to an embodiment of the present disclosure.

FIG. 2A is a schematic diagram of a semiconductor microwave oven according to an embodiment of the present disclosure. As shown in FIG. 2A, the semiconductor microwave oven includes: a body 1, a waveguide box 2, a semiconductor microwave source 3, a control device 4 and a microwave conversion device 5. The body 1 includes a chamber 10. The waveguide box 2 is set on the body 1.

Figure 3:
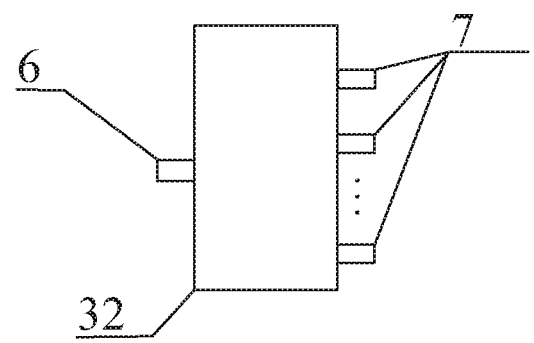
FIG. 3 is a schematic diagram of a power divider according to an embodiment of the present disclosure.
Figure 4:
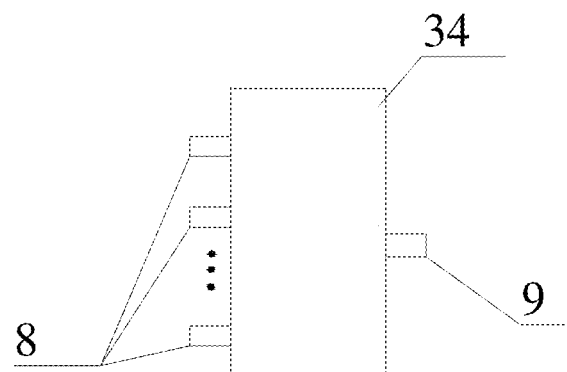
FIG. 4 is a schematic diagram of a power combiner according to an embodiment of the present disclosure.

Further, as shown in FIGS. 2A, 3 and 4, the semiconductor microwave source 3 includes: a signal source 31, a power divider 32, N drive amplifiers 33 and a power combiner 34. The signal source 31 is configured to generate a first microwave signal. The power divider 32 includes a first input end 6 and N output ends 7, in which the first input end 6 of the power divider 32 is connected to the signal source 31, power of the first microwave signal is allocated by the power divider 32 according to a preset proportion to generate N second microwave signals with a same frequency, and the N second microwave signals with the same frequency correspond to the N output ends 7 respectively for outputting (i.e. there is one-to-one correspondence relationship between the N second microwave signals and the N output ends 7), where, N is an integer larger than or equal to 2. The N drive amplifiers 33 are connected to the N output ends 7 respectively (i.e. there is one-to-one connection between the N drive amplifiers 33 and the N output ends 7). Each drive amplifier 33 is configured to conduct a drive amplification on a corresponding second microwave signal. The power combiner 34 includes N input ends 8 and a first output end 9. The N input ends 8 are connected to the N drive amplifiers 33 respectively (i.e. there is one-to-one connection between the N input ends 8 and the N drive amplifiers 33). The power combiner 34 is configured to combine the N second microwave signals after the drive amplification to obtain a third microwave signal and to output the third microwave signal via the first output end 9.

In embodiments of the present disclosure, the structure of the power divider 32 is show in FIG. 3 and the structure of the power combiner 34 is shown in FIG. 4. The power divider 32 divides the power of the first microwave signal provided by the signal source 31 according to the preset proportion, i.e. power of the second microwave signal outputted by each output end of the power divider 32 is in the preset proportion. When the preset proportion is 1, the power of the first microwave signal provided by the signal source 31 is equally divided by the power divider 32, i.e. the power of the second microwave signal outputted by each output end of the power divider 32 is equal. As shown in FIGS. 3 and 4, the power divider 32 may be used as the power combiner 34, and the power combiner 34 may also be used as the power divider 32, via exchanging the position of the input end and the output end.

The power divider 32 and the power combiner 34 may be a waveguide-type power divider or a microstrip-type power divider, and the power divider 32 and the power combiner 34 may be any type that may realize a power dividing or combining, such as a T-type junction power divider, a Wilkinson power divider, a waveguide magic T, a directional coupler, and a branch-line hybrid network. Therefore, both the power divider 32 and the power combiner 34 can be any one of the T-type junction power divider, the Wilkinson power divider, the waveguide magic T and the directional coupler.

As shown in FIG. 2A, the microwave conversion device 5 is connected to the first output end 9 of the power combiner 34 and the waveguide box 2 respectively. The microwave conversion device 5 is configured to feedback the third microwave signal to the waveguide box 2 so as to transmit the third microwave signal to the chamber 10. The microwave conversion device 5 may be a feed-in device like a probe and an antenna etc. The control device 4 is configured to control the signal source 31 to generate the first microwave signal. That is, the signal source 31 generates a low-power microwave signal, i.e. the first microwave signal, under the control of the control device 4. The first microwave signal is then divided into N second microwave signals via the power divider 32 and each second microwave signal is inputted into the corresponding drive amplifier 33. The second microwave signals after the drive amplification conducted by the drive amplifiers 33 are inputted into the power combiner 34 respectively. After the power combination, the microwave signal is fed back into the waveguide box 2 via the microwave conversion device 5 and is transmitted into the chamber 10.

Figure 2B:
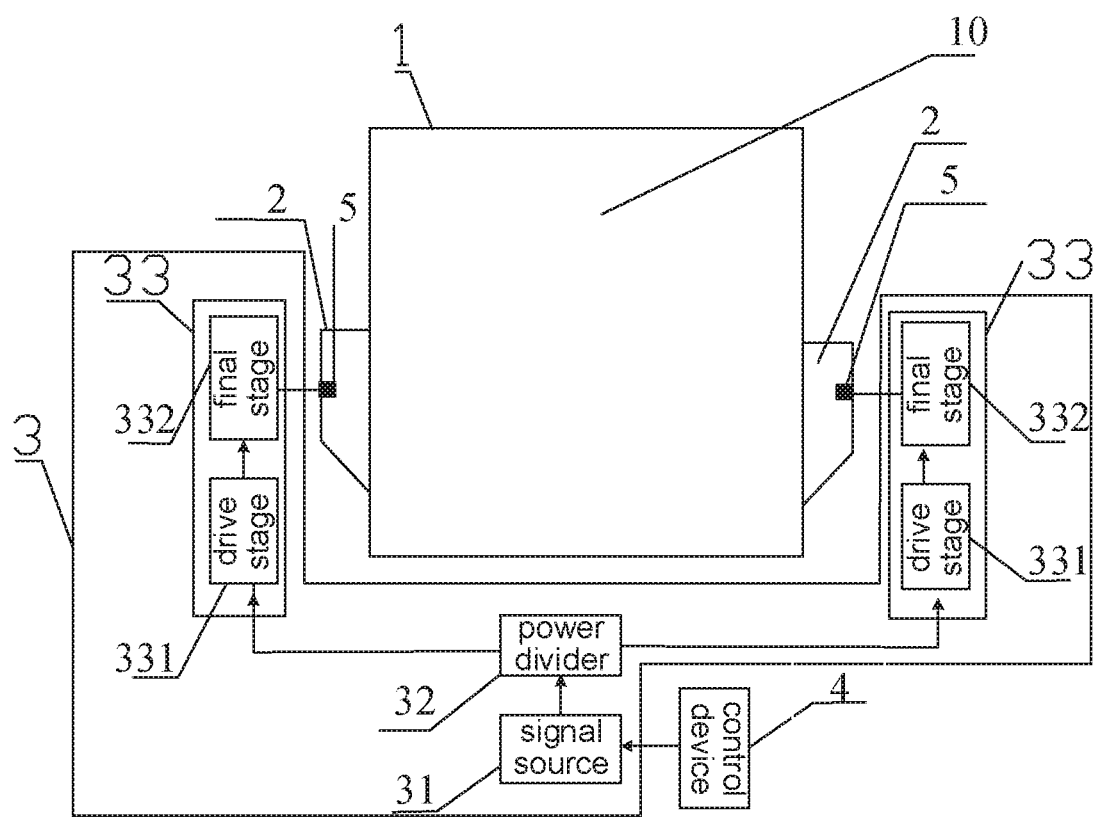
FIG. 2B is a schematic diagram of another semiconductor microwave oven according to an embodiment of the present disclosure.

FIG. 2B is a schematic diagram of another semiconductor microwave oven according to an embodiment of the present disclosure. As shown in FIG. 2B, the semiconductor microwave oven includes: a body 1, N waveguide boxes 2, a semiconductor microwave source 3, a control device 4 and N microwave conversion devices 5, where, N is an integer larger than or equal to 2.

The body 1 includes a chamber 10. The N waveguide boxes 2 are set on the body 1. As shown in FIG. 2B, N is equal to 2, and the two waveguide boxes are respectively set on the left and right side of the body 1.

Further, as shown in FIGS. 2B and 3, the semiconductor microwave source 3 includes: a signal source 31, a power divider 32 and N drive amplifiers 33. The signal source 31 is configured to generate a first microwave signal such as a low-power microwave signal. The power divider 32 includes a first input end 6 and N output ends 7, in which the first input end 6 of the power divider 32 is connected to the signal source 31, power of the first microwave signal is allocated by the power divider 32 according to a preset proportion to generate N second microwave signals with a same frequency, and the N second microwave signals with the same frequency correspond to the N output ends respectively for outputting(i.e. there is one-to-one correspondence relationship between the N second microwave signals and the N output ends 7). The N drive amplifiers 33 are connected to the N output ends 7 respectively (i.e. there is one-to-one connection between the N drive amplifiers 33 and the N output ends 7). Each drive amplifier 33 is configured to conduct a drive amplification on the corresponding second microwave signal.

In embodiments of the present disclosure, the structure of the power divider 32 is shown in FIG. 3. The power divider 32 divides the power of the first microwave signal provided by the signal source 31 according to a preset proportion, i.e. power of the second microwave signal outputted by each output end of the power divider 32 is in the preset proportion. When the preset proportion is 1, the power of the first microwave signal provided by the signal source 31 is equally divided by the power divider 32, i.e. the power of the second microwave signal outputted by each output end of the power divider 32 is equal.

The power divider 32 may be a waveguide-type power divider or a microstrip-type power divider, and the power divider 32 may be any type that may realize a power dividing, such as a T-type junction power divider, a Wilkinson power divider, a waveguide magic T, a directional coupler, and a branch-line hybrid network. Therefore, the power divider 32 can be any one of the T-type junction power divider, the Wilkinson power divider, the waveguide magic T and the directional coupler.

As shown in FIG. 2B, the N microwave conversion devices 5 are correspondingly connected to the N drive amplifiers 33 and the waveguide boxes 2 respectively (i.e. there is one-to-one connection between the N microwave conversion devices 5 and the N drive amplifiers 33, and one-to-one connection between the N microwave conversion devices 5 and the waveguide boxes 2). Each microwave conversion device 5 is configured to feedback the second microwave signal after the drive amplification conducted by the corresponding drive amplifier 33 to the corresponding waveguide box 2 so as to transmit the second microwave signals after the drive amplification to the chamber 10, and to combine the second microwave signals after the drive amplification into a high-power microwave signal. The microwave conversion device 5 may be a feed-in device like a probe and an antenna etc. The control device 4 is configured to control the signal source 31 to generate the first microwave signal. That is, the signal source 31 generates a low-power microwave signal, i.e. the first microwave signal, under the control of the control device 4. The first microwave signal is then divided into the N second microwave signals via the power divider 32 and the second microwave signals are inputted into each drive amplifier 33. The second microwave signals after the drive amplification conducted by the drive amplifiers 33 are inputted into the corresponding microwave conversion devices 5 respectively. The second microwave signals after the drive amplification are fed back into the waveguide boxes 2 via the microwave conversion devices 5 and are transmitted into the chamber 10, and are finally combined into a high-power microwave in the chamber 10.

The waveguide box 2 and the microwave conversion device 5 are constructed into the microwave input device, and the number of the waveguide boxes 2 is at least 1.

That is, the microwave input device includes at least one waveguide box 2, and the at least one waveguide box 2 is set on the body 1. As shown in FIG. 2A, if the number of the waveguide box 2 is 1, the semiconductor microwave source 3 further includes a power combiner 34, and the microwave input device further includes a microwave conversion device 5, where, the power combiner includes N input ends and a first output end, the N input ends are connected to the N drive amplifiers respectively, the microwave conversion device is respectively connected to the first output end and the waveguide box, the power combiner is configured to combine the N second microwave signals after the drive amplification to a third microwave signal and to output the third microwave signal via the first output end, and the microwave conversion device is configured to feedback the third microwave signal to the waveguide box so as to transmit the third microwave signal to the chamber. As shown in FIG. 2B, if the number of the waveguide boxes is N, e.g. N is 2, the microwave input device further includes N microwave conversion devices 5, where, the N microwave conversion devices are connected to the corresponding N drive amplifiers and the corresponding N waveguide boxes respectively, and each microwave conversion device is configured to feedback the second microwave signal after the drive amplification conducted by the corresponding drive amplifier to the corresponding waveguide box so as to transmit the second microwave signals after the drive amplification conducted by the N drive amplifiers to the chamber.

Therefore, the semiconductor microwave oven in embodiments of the present disclosure includes: a body, a microwave input device, a semiconductor microwave source and a control device. The body includes a chamber, and the microwave input device is in communication with the chamber. The semiconductor microwave source includes a signal source, a power divider and N drive amplifiers. The signal source is configured to generate a first microwave signal. The power divider includes a first input end and N output ends, in which the first input end of the power divider is connected to the signal source, power of the first microwave signal is allocated by the power divider according to a preset proportion to generate N second microwave signals with a same frequency, and the N second microwave signals with the same frequency correspond to the N output ends for outputting, where, N is an integer larger than or equal to 2. The N drive amplifiers are connected to the N output ends respectively. Each drive amplifier is configured to conduct a drive amplification on a corresponding second microwave signal and to input the N second microwave signal after the drive amplification to the microwave input device, so as to transmit the second microwave signal via the microwave input device to the chamber. The control device is configured to control the signal source to generate the first microwave signal.

According to an embodiment of the present disclosure, as shown in FIG. 2A or 2B, the drive amplifier 33 further includes: a drive component 331, i.e. a drive stage, and an amplification component 332, i.e. a final stage. The drive component 331 is configured to conduct a first drive amplification on the second microwave signal so as to generate a fourth microwave signal. The amplification component 332 is connected to the drive component 331, and configured to conduct a second amplification on the fourth microwave signal so as to generate the second microwave signal after the drive amplification. In addition, as shown in FIG. 2A, the number of the drive components 331 and the number of the amplification components 332 are equal to the number of the output ends of the power divider 32 and the number of the input ends of the power combiner 34.

Power of the first microwave signal is greater than power of the second microwave signal, power of the fourth microwave signal is greater than power of the second microwave signal, and power of the second microwave signal after the drive amplification is greater than power of the fourth microwave signal.

Figure 5:
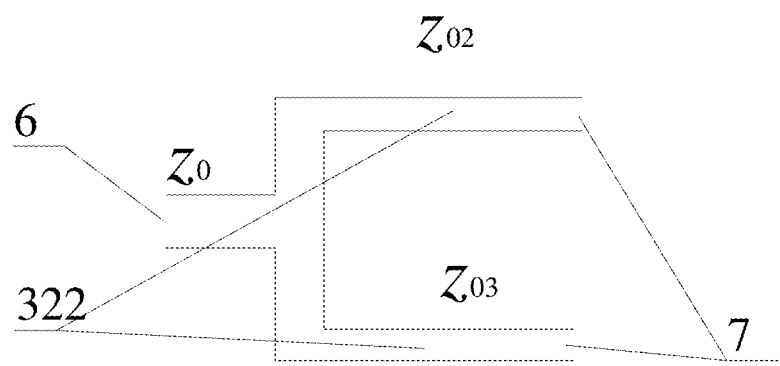
FIG. 5 is a schematic diagram of a T-type junction power divider according to an embodiment of the present disclosure.

According to an embodiment of the present disclosure, if the power divider 32 is a T-type junction power divider, as shown in FIG. 5, the low-power first microwave signal generated by the signal source 31 is inputted via the first input end 6. Two impedance transforming lines 322 with ¼ wavelength (λ) are set, and the characteristic impedances are Z02 and Z03 respectively. Different power dividing for the outputted second microwave signals is realized by setting impedances of Z02 and Z03, and the second microwave signals after dividing are outputted via two output ends 7 respectively. The T-type junction power divider may be used as the power combiner 34 conversely.

Figure 6:
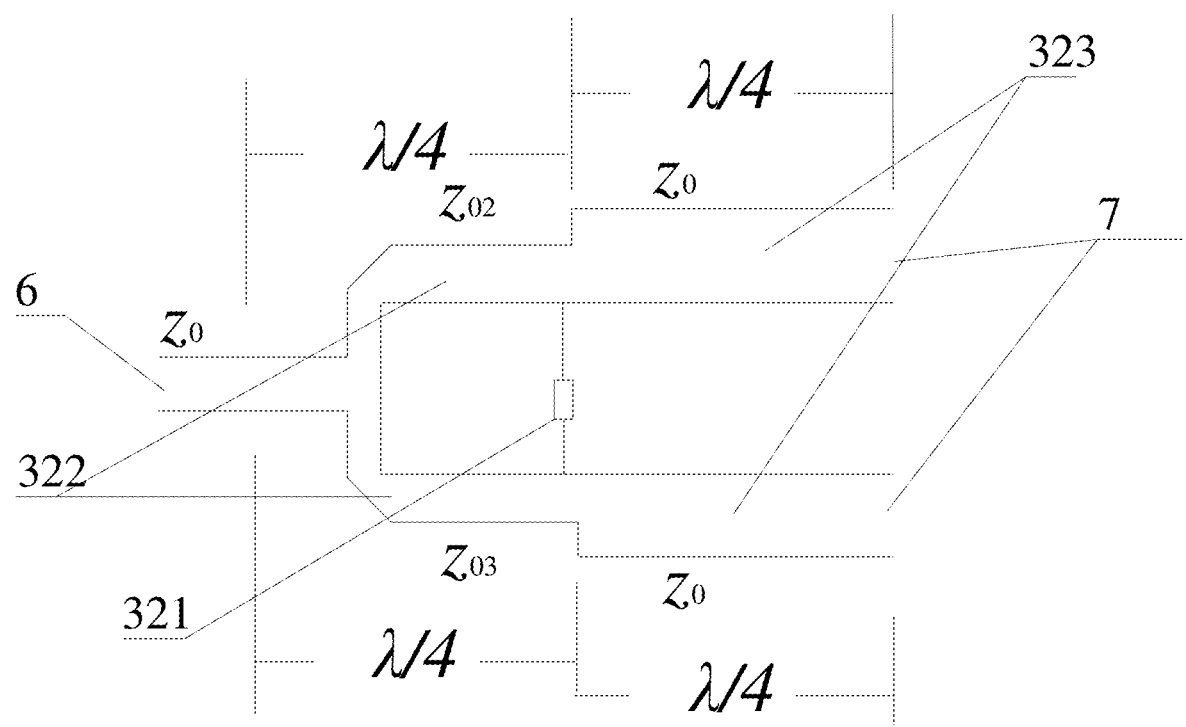
FIG. 6 is a schematic diagram of a Wilkinson power divider according to another embodiment of the present disclosure.

According to another embodiment of the present disclosure, if the power divider 32 is a Wilkinson power divider, as shown in FIG. 6, the low-power first microwave signal generated by the signal source 31 is inputted via the input end 6 of the Wilkinson power divider. Two impedance transforming lines 322 with ¼ wavelength are set, and the characteristic impedances are Z02 and Z03 respectively, and an isolation resistance 321 is set, so as to ensure that the two output ends 7 of the Wilkinson power divider are isolated. If any one of the output ends 7 is dismatched, there will be current flows past the isolation resistance 321 and the power will be wasted on the isolation resistance 321, which shall not affect the output of another output end 7. The two output ends 7 then respectively pass impedance transforming lines 323 with ¼ wavelength, such that the power dividing is realized. When the power is equally divided, the characteristic impedance of the input end is Z0, then Z02=Z03=√2Z0, and the characteristic impedance of the impedance transforming lines 323 is Z0. Similarly, the Wilkinson power divider may be used as the power combiner 34 conversely.

Figure 7:
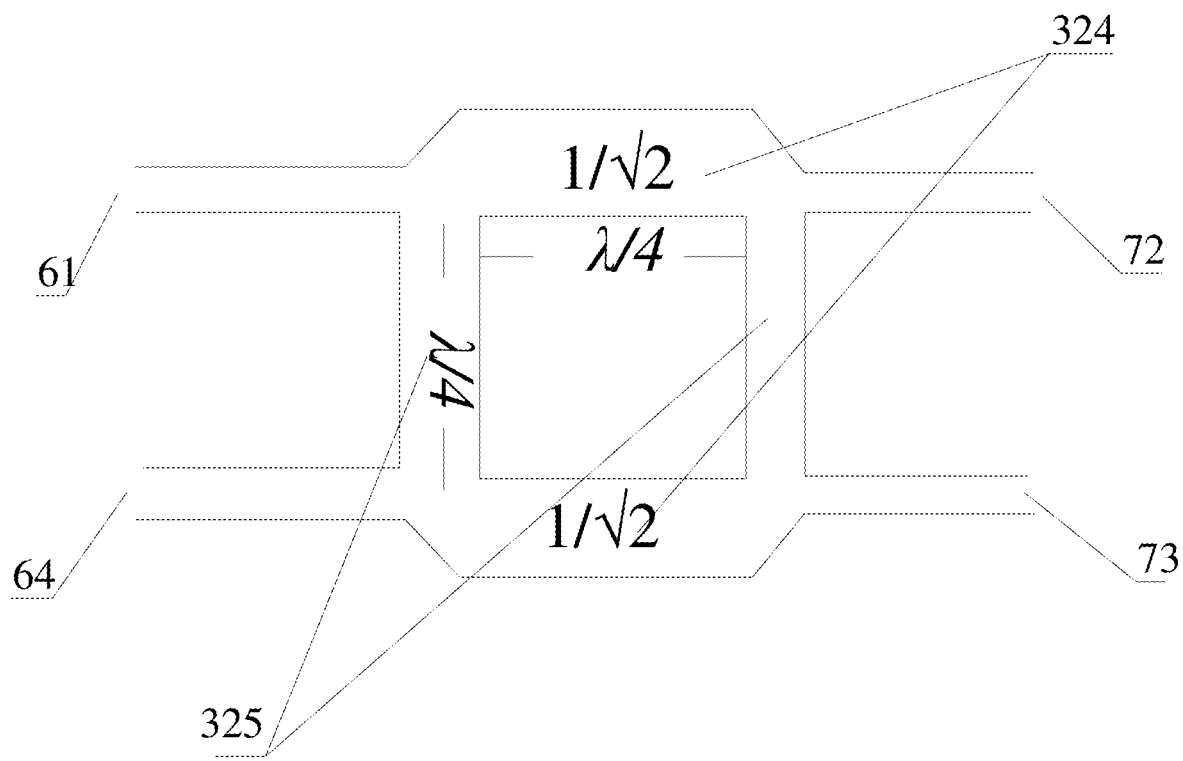
FIG. 7 is a schematic diagram of a directional coupler according to yet another embodiment of the present disclosure.

According to yet another embodiment of the present disclosure, when the power divider 32 is a directional coupler, as shown in FIG. 7, it includes two parallel conduction bands 324, the coupling is realized via two branch conduction bands 325, and the length and the interval of the branch conduction bands 325 are both ¼ wavelength. The low-power first microwave signal generated by the signal source 31 is inputted via an input end 61. In an ideal situation, the input end 61 has no reflection, the power inputted is outputted by ends 72 and 73, and end 64 has no output, i.e. ends 61 and 64 are isolated with each other. For a situation that power is equally divided, the characteristic impedance of the branch conduction bands are similar with input and output lines, and the characteristic resistance of the parallel conduction bands is 1/√2 of the input and output lines. Similarly, the directional coupler may be used as the power combiner 34 conversely.

Figure 8:
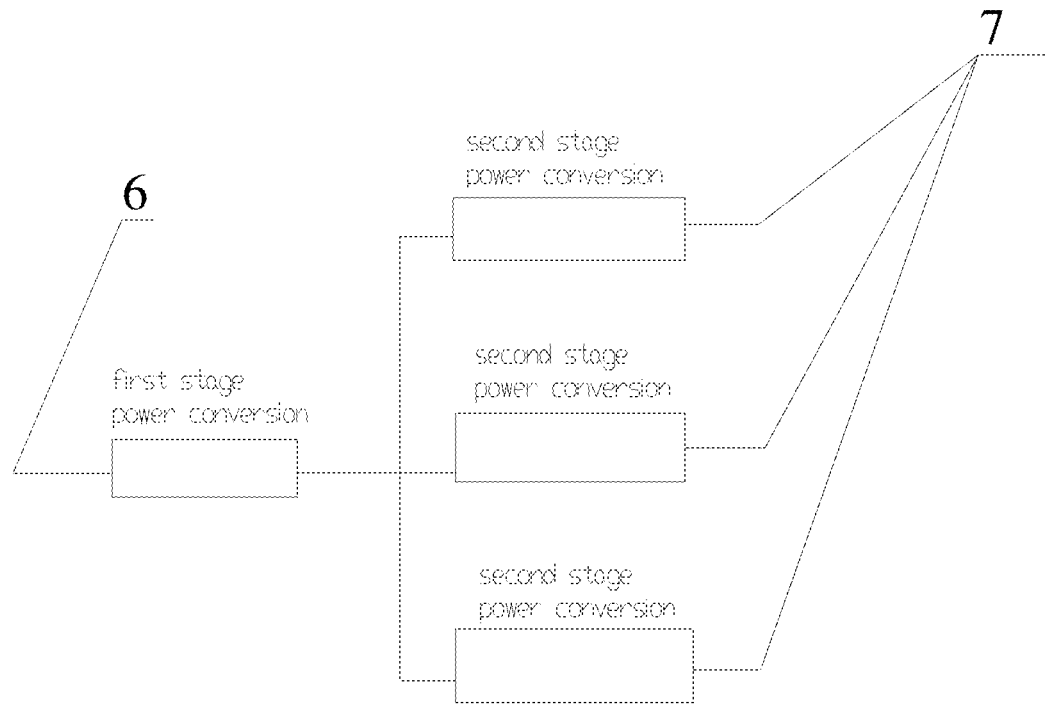
FIG. 8 is a schematic diagram of a three-way distribution of a power divider according to a first embodiment of the present disclosure.

In embodiments of the present disclosure, when the number of the outputs of the power divider 32 is greater than two, a multi-stage impedance conversion is needed. For example, according to a first embodiment of the present disclosure, as shown in FIG. 8, the low-power first microwave signal generated by the signal source 31 is inputted via the first input end 6, and it is divided into three signals after conducting a first stage impedance conversion, and finally three second microwave signals are outputted via three output ends respectively after conducting a second stage impedance change.

Figure 9:
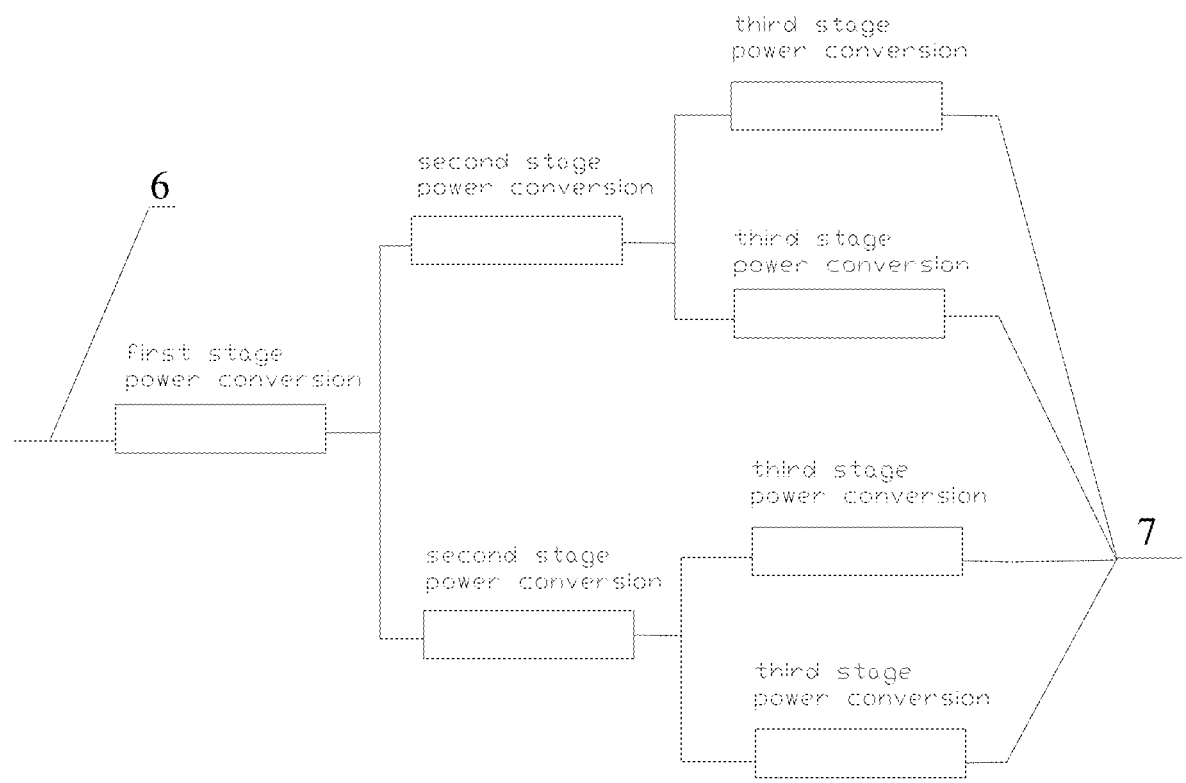
FIG. 9 is a schematic diagram of a four-way distribution of a power divider according to a second embodiment of the present disclosure.

According to a second embodiment of the present disclosure, as shown in FIG. 9, the low-power first microwave signal generated by the signal source 31 is inputted via the first input end 6, and it is divided into two signals after conducting a first stage impedance conversion, then the two signals are divided into four signals after conducting a second stage impedance conversion and a following third stage impedance conversion, and finally four second microwave signals are outputted via four output ends respectively.

Figure 10:
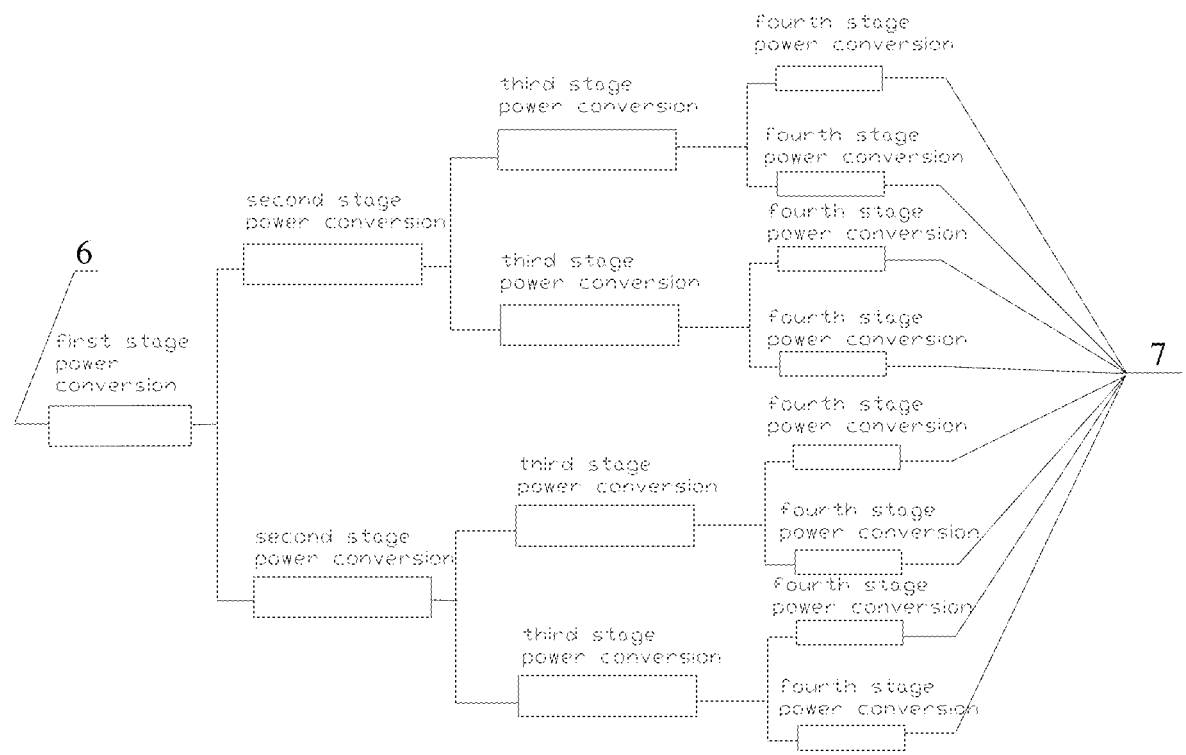
FIG. 10 is a schematic diagram of an eight-way distribution of a power divider according to a third embodiment of the present disclosure.

According to a third embodiment of the present disclosure, as shown in FIG. 10, the low-power first microwave signal generated by the signal source 31 is inputted via the first input end 6, and it is divided into two signals after conducting a first stage impedance conversion, then the two signals are divided into four signals after conducting a second stage impedance conversion and a following third stage impedance conversion, and then the four signals are divided into eight signals after conducting a fourth stage impedance conversion, and finally eight second microwave signals are outputted via eight output ends correspondingly.

Figure 11:
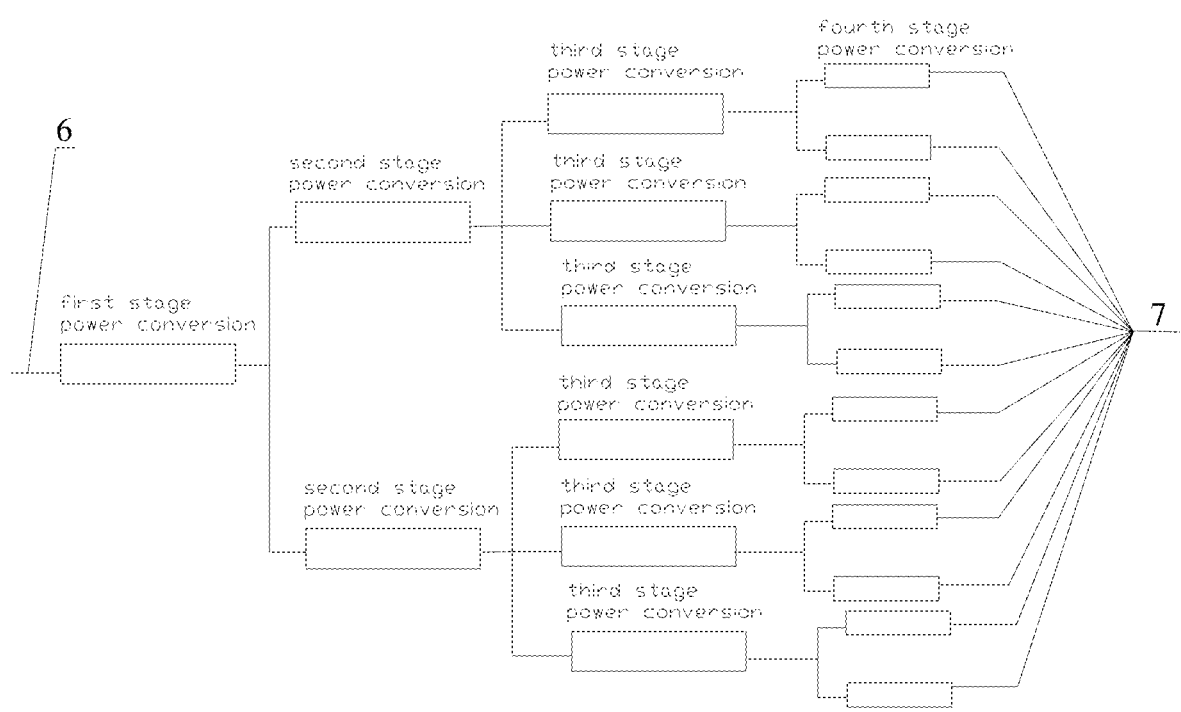
FIG. 11 is a schematic diagram of a twelve-way distribution of a power divider according to a fourth embodiment of the present disclosure.

According to a fourth embodiment of the present disclosure, as shown in FIG. 11, the low-power first microwave signal generated by the signal source 31 is inputted via the first input end 6, and it is divided into two signals after conducting a first stage impedance conversion, then the two signals are divided into six signals after conducting a second stage impedance conversion and a following third stage impedance conversion, and then the six signals are divided into twelve signals after conducting a fourth stage impedance conversion, and finally twelve second microwave signals are outputted via twelve output ends correspondingly.

According to FIGS. 8 to 11, the low-power first microwave signal generated by the signal source 31 is inputted via the first input end 6, and it is divided into two or three signals after conducting a first stage impedance conversion, and the two or three signals are then divided after conducting a second stage impedance conversion. If the requirement of the number of the microwave sources may still not be satisfied, signals may be conducted the third stage and fourth stage impedance conversion, will finally be outputted from multiple output ends 7.

Figure 12A:
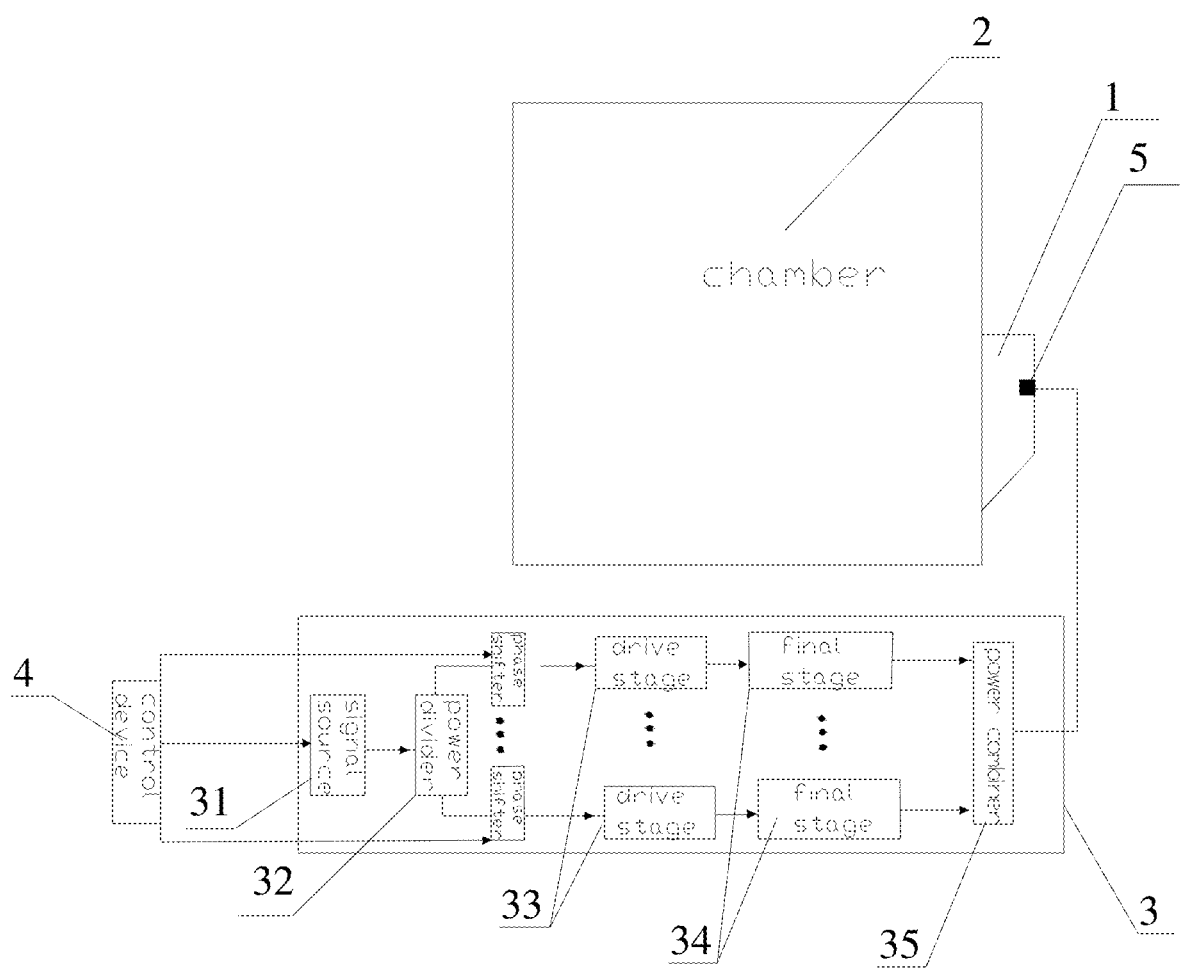
FIG. 12A is a schematic diagram of a semiconductor microwave oven according to a specific embodiment of the present disclosure.
Figure 12B:
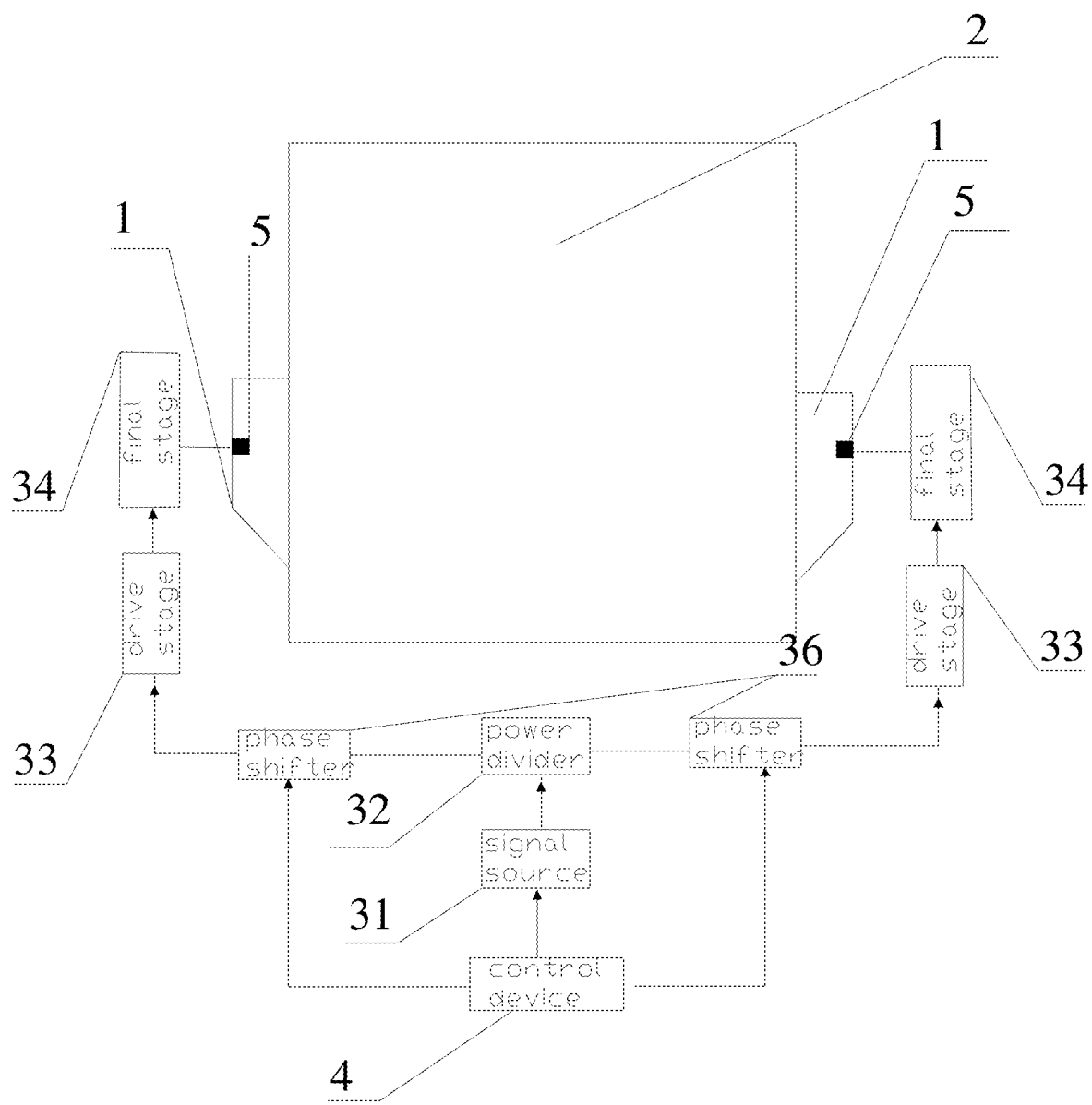
FIG. 12B is a schematic diagram of a semiconductor microwave oven according to another specific embodiment of the present disclosure.

According to an embodiment of the present disclosure, as shown in FIG. 12A or 12B, the semiconductor microwave source 3 further includes N phase shifters 35. The N phase shifters 35 are respectively connected between the N output ends 7 and the N drive amplifiers 33, in which, each phase shifter 35 is configured to perform a phase adjustment on the second microwave signal output by the corresponding output end in the N output ends under the control of the control device 4, such that the efficiency of the semiconductor microwave source is improved.

The phase shifter 35 may be any one of a phase shifter type that may be suitable for microwave thermal spectrum like a PIN diode phase shifter, a ferrite phase shifter, and a vector modulation phase shifter. The phase shifter 35 may also be any one of a loaded-line phase shifter, and a switch-line phase shifter.

Figure 13:
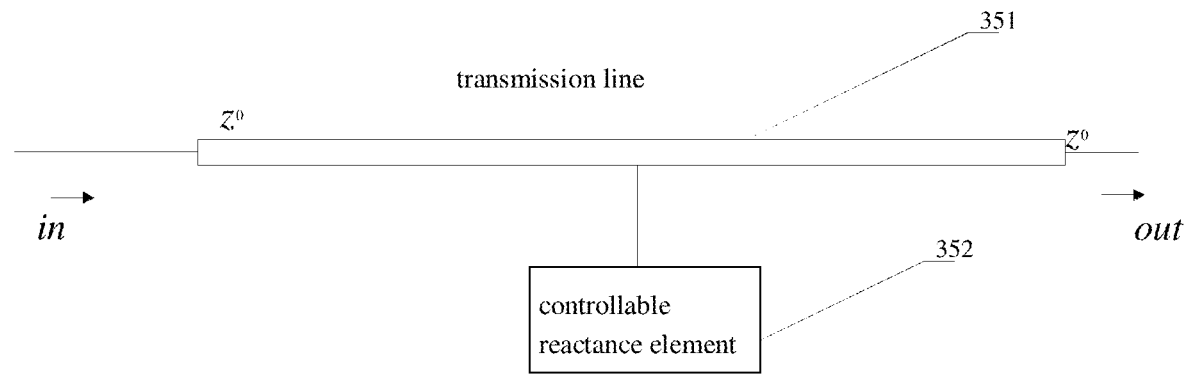
FIG. 13 is a schematic diagram of a loaded-line phase shifter according to an embodiment of the present disclosure.

If the phase shifter 35 is the loaded-line phase shifter, as shown in FIG. 13, a controllable reactance element 352 is provided on a uniform transmission line 351 by the loaded-line phase shifter, and the reactance element 352 and the transmission line 351 can be connected parallelly or seriesly, in which, a phase shift amount may be introduced by controlling the reactance value of the reactance element by the control device 4.

Figure 14:
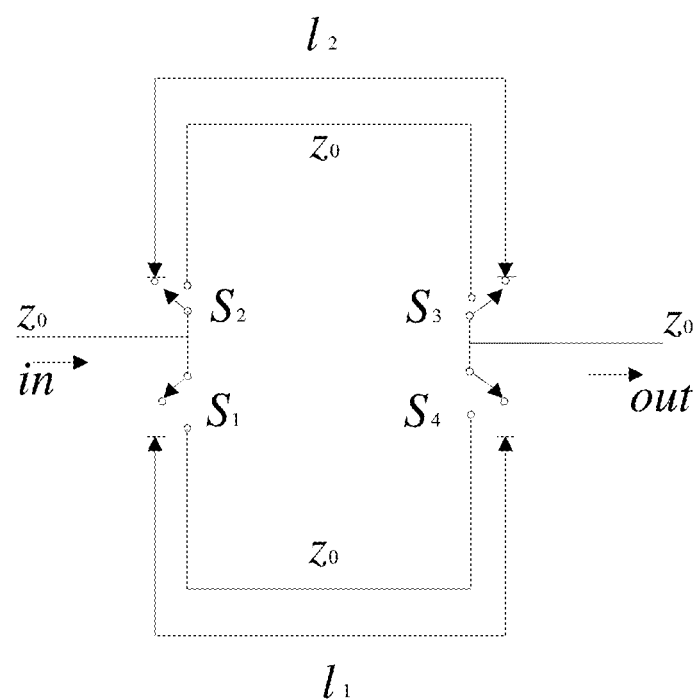
FIG. 14 is a schematic diagram of a series-connected switch-line phase shifter according to an embodiment of the present disclosure.
Figure 15:
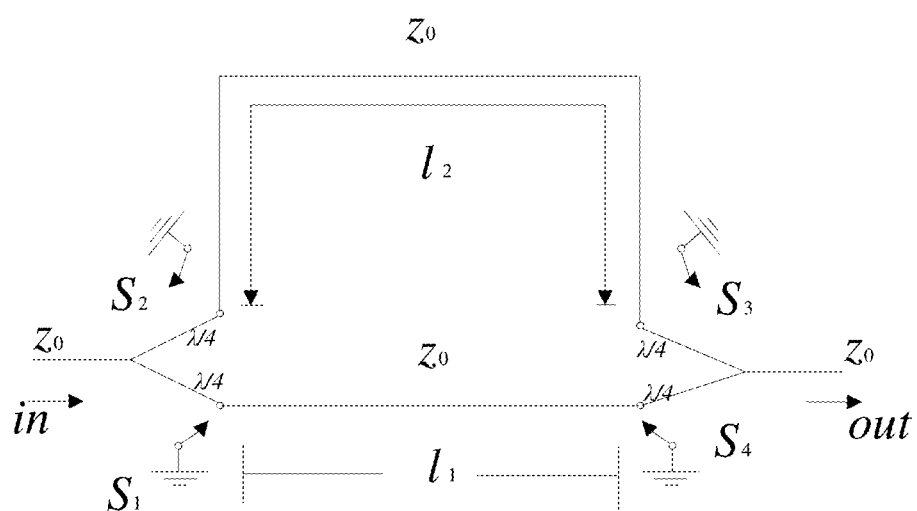
FIG. 15 is a schematic diagram of a parallel-connected switch-line phase shifter according to an embodiment of the present disclosure.
Figure 16:
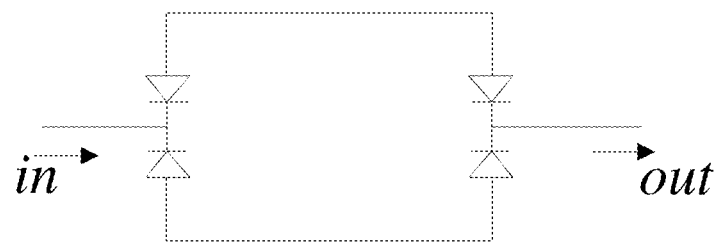
FIG. 16 is a schematic diagram of a parallel-connected switch-line phase shifter according to another embodiment of the present disclosure.

If the phase shifter 35 is the switch-line phase shifter, as shown in FIG. 14 or 15, in which, FIG. 14 is a schematic diagram of a series-connected switch-line phase shifter. When switches S1 and S4 are engaged, and S2 and S3 are disengaged, the second microwave signal is transmitted via a transmission route $1_1$; and when the switch status are opposite, the switches S1 and S4 are disengaged, and S2 and S3 are engaged, the second microwave signal is transmitted via a transmission route $1_2$, a phase change is realized according to the change of the transmission route. The phase shifter shown in FIG. 15 is a parallel switch-line phase shifter. When the switches S1 and S4 are engaged, the transmission route 11 is a short circuit, and the switches S2 and S3 are disengaged, the second microwave signal is transmitted via the transmission route $1_2$, otherwise is transmitted via the transmission route $1_1$. A switch may also be replaced by a diode, as shown in FIG. 16.

In conclusion, according to the semiconductor microwave oven in the embodiments of the present disclosure, the number of the signal source for generating microwave signals is 1. Therefore, multiple-route semiconductor power sources share a same signal source, such that the multiple-route semiconductor power sources can be ensured to work under a same frequency, and thus realizing a high-efficiency power output, and ensuring the heating efficiency of the semiconductor microwave oven.

According to the semiconductor microwave oven in the embodiments of the present disclosure, the second microwave signals with the same frequency outputted by the N output ends of the power divider share a same signal source so as to ensure to work in the same frequency, such that a high-efficiency power output is realized and a heating efficiency is ensured. In addition, the structure of the semiconductor microwave oven in the embodiments of the present disclosure is more simple and compact, and it is cost-saving.

In addition, a semiconductor microwave source of a semiconductor microwave oven is further provided in embodiments of the present disclosure. The semiconductor microwave source includes: a signal source, a power divider and N drive amplifiers. The signal source is configured to generate a first microwave signal. The power divider includes a first input end and N output ends, in which the first input end of the power divider is connected to the signal source, power of the first microwave signal is allocated by the power divider according to a pre-set proportion to generate N second microwave signals with a same frequency, and the N second microwave signals with the same frequency correspond to the N output ends respectively for outputting, where, N is an integer larger than or equal to 2. The N drive amplifiers are connected to the N output ends respectively. Each drive amplifier is configured to conduct a drive amplification on a corresponding second microwave signal and to input the second microwave signal after the drive amplification to the microwave input device, so as to transmit the second microwave signal after the drive amplification via the microwave input device to the chamber. The signal source is configured to generate the first microwave signal under a control of a control device of the semiconductor microwave oven.

In embodiments of the present disclosure, the microwave input device includes at least one waveguide box, and the at least one waveguide box is set on the body. If the number of the waveguide box is 1, the semiconductor microwave source further includes a power combiner, and the microwave input device further includes a microwave conversion device, where, the power combiner includes N input ends and a first output end, the N input ends are connected to the N drive amplifiers respectively, the microwave conversion device is respectively connected to the first output end and the waveguide box, the power combiner is configured to combine the N second microwave signals after the drive amplification to obtain a third microwave signal and to output the third microwave signal via the first output end, and the microwave conversion device is configured to feedback the third microwave signal to the waveguide box so as to transmit the third microwave signal to the chamber. If the number of the waveguide boxes is N, the microwave input device further includes N microwave conversion devices, the N microwave conversion devices are connected to the corresponding N drive amplifiers and the corresponding N waveguide boxes respectively, and each microwave conversion device is configured to feedback the second microwave signal after the drive amplification conducted by the corresponding drive amplify to the corresponding waveguide box so as to transmit the second microwave signals after the drive amplification conducted by the N drive amplifiers to the chamber.

Specifically, according to an embodiment of the present disclosure, as shown in FIG. 2A, when the number of the waveguide box is 1, the above semiconductor microwave source 3 of the semiconductor microwave oven includes: a signal source 31, a power divider 32, N drive amplifiers 33 and a power combiner 34. The signal source 31 is configured to generate a first microwave signal. The power divider 32 includes a first input end 6 and N output ends 7, in which the first input end 6 of the power divider 32 is connected to the signal source 31, power of the first microwave signal is allocated by the power divider 32 according to a pre-set proportion to generate N second microwave signals with a same frequency, and the N second microwave signals with the same frequency correspond to the N output ends 7 for outputting, where, N is an integer larger than or equal to 2. The N drive amplifiers 33 are connected to the N output ends 7 respectively. Each drive amplifier 33 is configured to conduct a drive amplification on a corresponding second microwave signal. The power combiner 34 includes N input ends 8 and a first output end 9. The N input ends 8 and the N drive amplifiers 33 are correspondingly connected. The power combiner 34 is configured to combine the N second microwave signals after the drive amplification to obtain a third microwave signal and to output the third microwave signal to the microwave conversion device 5 via the first output end 9, and then the third microwave signal is fed into the waveguide box 2 by the microwave conversion device 5, so as to transmit the third microwave signal to the chamber 10. The signal source 31 is configured to c generate the first microwave signal under a control of the control device 4 of the semiconductor microwave oven.

According to another embodiment of the present disclosure, when the number of the waveguide boxes is N, e.g. as shown in FIG. 2B, when the number of the waveguide box is 2, the above semiconductor microwave source 3 of the semiconductor microwave oven includes: a signal source 31, a power divider 32, and N drive amplifiers 33. The signal source 31 is configured to generate a first microwave signal, e.g. a low-power microwave signal. The power divider 32 includes a first input end 6 and N output ends 7, in which the first input end 6 of the power divider 32 is connected to the signal source 31, power of the first microwave signal is allocated by the power divider 32 according to a pre-set proportion to generate N second microwave signals with a same frequency, and the N second microwave signals with the same frequency correspond to the N output ends respectively for outputting, where, N is an integer larger than or equal to 2. The N drive amplifiers 33 are connected to the N output ends 7 respectively. Each drive amplifier 33 is configured to conduct a drive amplification on a corresponding second microwave signal. The N second microwave signals after the drive amplification are sent to the corresponding microwave input devices 5 by the N drive amplifiers 33 respectively, and then are fed into the corresponding waveguide boxes 2 by the N microwave input devices 5, so as to transmit via the microwave input device to the chamber 10; where, the signal source 31 is configured to generate the first microwave signal under a control of the control device 4 of the semiconductor microwave oven.

The power divider 32 and the power combiner 34 may be a waveguide-type power divider or a microstrip-type power divider, and the power divider 32 and the power combiner 34 may be any type that may realize a power dividing or combining, such as a T-type junction power divider, a Wilkinson power divider, a waveguide magic T, a directional coupler, and a branch-line hybrid network. Therefore, both the power divider 32 and the power combiner 34 can be any one of the T-type junction power divider, the Wilkinson power divider, the waveguide magic T and the directional coupler.

According to an embodiment of the present disclosure, as shown in FIG. 2A or 2B, the drive amplifier 33 further includes: a drive component 331 and an amplification component 332. The drive component 331 is configured to conduct a first drive amplification on the second microwave signal so as to generate a fourth microwave signal. The amplification component 332, is connected to the drive component, and is configured to conduct a second amplification on the fourth microwave signal so as to generate the second microwave signal after the drive amplification. In addition, as shown in FIG. 2A, the number of the drive components 331 and the number of the amplification components 332 are equal to the number of the output end of the power divider 32 and the number of the input end of the power combiner 34.

Power of the first microwave signal is greater than power of the second microwave signal, power of the fourth microwave signal is greater than power of the second microwave signal, and power of the second microwave signal after the drive amplification is greater than power of the fourth microwave signal.

Further, according to an embodiment of the present disclosure, as shown in FIG. 12A or 12B, the above semiconductor microwave source of the semiconductor microwave oven further includes N phase shifters 35. The N phase shifters 35 are respectively connected between the N output ends 7 and the N drive amplifiers 33, in which, each phase shifter 33 is configured to perform a phase adjustment on the second microwave signal output by the corresponding output end in the N output ends under the control of the control device 4, such that the efficiency of the semiconductor microwave source is improved.

The phase shifter is any one of a PIN diode phase shifter, a ferrite phase shifter, a vector modulation phase shifter, a loaded-line phase shifter, and a switch-line phase shifter.

According to the semiconductor microwave source of the semiconductor microwave oven in the embodiments of the present disclosure, the second microwave signals with the same frequency outputted respectively by the N output ends of the power divider share a same signal source so as to ensure to work in the same frequency, such that a high-efficiency power output is realized and a heating efficiency is ensured. In addition, the structure of the semiconductor microwave oven in the embodiments of the present disclosure is more simple and compact, and it is cost-saving.

In the description of the present specification, reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A semiconductor microwave oven, comprising:
a body having a chamber;
a microwave input device in communication with the chamber;
a semiconductor microwave source comprising:
a signal source configured to generate a first microwave signal,
a power divider comprising a first input end and N output ends, wherein the first input end of the power divider is connected to the signal source, wherein the power divider allocates power for the first microwave signal according to a preset proportion to generate N second microwave signals each having a same frequency,
wherein the N second microwave signals correspond to respective output ends of the power divider, and wherein N is an integer larger than or equal to two,
N drive amplifiers connected to the respective output ends of the power divider, wherein each drive amplifier is configured to conduct a drive amplification on a respective second microwave signal and to output an amplified respective second microwave signal, the N drive amplifiers each comprising:
a drive component configured to conduct a first drive amplification on the respective second microwave signal so as to generate a respective fourth microwave signal; and
an amplification component connected to the drive component, the amplification component configured to conduct a second amplification on the respective fourth microwave signal so as to generate the amplified respective second microwave signal after the first drive amplification by the drive component;
a power combiner connected to receive N amplified second microwave signals from the N drive amplifiers, the power combiner being configured to combine the N amplified second microwave signals into a single third microwave signal and to output the third microwave signal to the chamber via the microwave input device; and a control device configured to control the signal source to generate the first microwave signal.

2. The semiconductor microwave oven according to claim 1, wherein the microwave input device comprises at least one waveguide box, and the at least one waveguide box is set on the body.

3. The semiconductor microwave oven according to claim 2, wherein the microwave input device further comprises a microwave conversion device,
wherein the power combiner comprises N input ends and a first output end, the N input ends being connected to the N drive amplifiers,
wherein the microwave conversion device is connected between the power combiner and the waveguide box, and
wherein the microwave conversion device is configured to provide the third microwave signal to the waveguide box for transmitting the third microwave signal to the chamber.

4. The semiconductor microwave oven according to claim 3, wherein both the power divider and the power combiner each comprise at least one of a T-type junction power divider, a Wilkinson power divider, a waveguide magic T, and a directional coupler.

5. The semiconductor microwave oven according to claim 1, wherein power of the first microwave signal is greater than power of the second microwave signal, power of the fourth microwave signal is greater than power of the second microwave signal, and power of the second microwave signal after conducting the first drive amplification is greater than power of the fourth microwave signal.

6. The semiconductor microwave oven according to claim 1, wherein the semiconductor microwave source further comprises:
N phase shifters connected between the N output ends of the power divider and the drive amplifiers, wherein each phase shifter is configured to perform a phase adjustment on respective second microwave signals output by the N output ends under control of the control device.

7. The semiconductor microwave oven according to claim 6, wherein each phase shifter comprises at least one of a PIN diode phase shifter, a ferrite phase shifter, a vector modulation phase shifter, a loaded-line phase shifter, and a switch-line phase shifter.

8. A semiconductor microwave source of a semiconductor microwave oven, comprising:
a signal source configured to generate a first microwave signal;
a power divider comprising a first input end and N output ends, wherein the first input end of the power divider is connected to the signal source, wherein the power divider allocates power for the first microwave signal according to a preset proportion to generate N second microwave signals each having a same frequency, wherein the N second microwave signals correspond to respective output ends, and wherein N is an integer larger than or equal to two,
N drive amplifiers connected to respective output ends, wherein each drive amplifier is configured to conduct a drive amplification on a respective second microwave signal and to output an amplified respective second microwave signal, the N drive amplifiers each comprising:

a drive component configured to conduct a first drive amplification on the respective second microwave signal so as to generate a respective fourth microwave signal; and an amplification component connected to the drive component, the amplification component configured to conduct a second amplification on the respective fourth microwave signal so as to generate the amplified respective second microwave signal after the first drive amplification by the drive component;

a power combiner connected to receive the N amplified second microwave signals from the N drive amplifiers, the power combiner being configured to combine the N amplified second microwave signals into a single third microwave signal and to output the third microwave signal to the chamber via the microwave input device; and wherein the signal source is configured to generate the first microwave signal under control of a control device of the semiconductor microwave oven.

9. The semiconductor microwave source of the semiconductor microwave oven according to claim 8, wherein the microwave input device comprises at least one waveguide box, and the at least one waveguide box is set on the body.

10. The semiconductor microwave source of the semiconductor microwave oven according to claim 9, wherein both the power divider and the power combiner each comprise at least one of a T-type junction power divider, a Wilkinson power divider, a waveguide magic T, and a directional coupler.

11. The semiconductor microwave source of the semiconductor microwave oven according to 9, wherein the microwave input device further comprises a microwave conversion device, wherein the power combiner comprises N input ends and a first output end, the N input ends being connected to respective drive amplifiers, wherein the microwave conversion device is connected between the power combiner and the waveguide box, and wherein the microwave conversion device is configured to provide the third microwave signal to the waveguide box for transmitting the third microwave signal to the chamber.

12. The semiconductor microwave source of the semiconductor microwave oven according to claim 8, wherein power of the first microwave signal is greater than power of the second microwave signal, power of the fourth microwave signal is greater than power of the second microwave signal, and power of the second microwave signal after the first drive amplification is greater than power of the fourth microwave signal.

13. The semiconductor microwave source of the semiconductor microwave oven according to claim 8, further comprising:

N phase shifters connected between N output ends of the power divider and the drive amplifiers, wherein each phase shifter is configured to perform a phase adjustment on respective second microwave signals output by the N output ends under control of the control device.

14. The semiconductor microwave source of the semiconductor microwave oven according to claim 13, wherein each phase shifter comprises at least one of a PIN diode phase shifter, a ferrite phase shifter, a vector modulation phase shifter, a loaded-line phase shifter, and a switch-line phase shifter.

* * * * *

UNITED STATES PATENT AND TRADEMARK OFFICE
CERTIFICATE OF CORRECTION

PATENT NO. : 10,588,182 B2
APPLICATION NO. : 15/314060
DATED : March 10, 2020
INVENTOR(S) : Zhang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 463 days.

Signed and Sealed this
Twentieth Day of December, 2022

*Katherine Kelly Vidal*

Katherine Kelly Vidal
*Director of the United States Patent and Trademark Office*